United States Patent [19]

Nilsen

[11] Patent Number: 5,376,602
[45] Date of Patent: Dec. 27, 1994

[54] LOW TEMPERATURE, PRESSURELESS SINTERING OF SILICON NITRIDE

[75] Inventor: Kevin J. Nilsen, Midland, Mich.

[73] Assignee: The Dow Chemical Company, Midland, Mich.

[21] Appl. No.: 178,376

[22] Filed: Dec. 23, 1993

[51] Int. Cl.$^5$ ............................................. C04B 35/58
[52] U.S. Cl. ...................................... 501/97; 501/98; 264/65
[58] Field of Search ....................... 501/97, 98; 264/65

[56] References Cited

U.S. PATENT DOCUMENTS

| | | | |
|---|---|---|---|
| 3,953,221 | 4/1976 | Lange | 501/98 |
| 4,070,198 | 1/1978 | Chyung et al. | 106/52 |
| 4,264,547 | 4/1981 | de Pous | 501/98 X |
| 4,280,973 | 7/1981 | Moskowitz et al. | 106/73 |
| 4,443,394 | 4/1984 | Ezis | 264/65 |
| 4,558,018 | 12/1985 | Matsuhiro et al. | 501/97 |
| 4,615,990 | 10/1986 | Richon et al. | 501/92 |
| 4,640,903 | 2/1987 | Matsuhiro et al. | 501/97 |
| 4,680,742 | 7/1987 | Yamada et al. | 369/13 |
| 4,692,420 | 9/1987 | Oda et al. | 501/97 |
| 4,696,778 | 9/1987 | Neil | 264/65 |
| 4,880,756 | 11/1989 | Urashima et al. | 501/97 |
| 4,883,776 | 11/1989 | Pyzik et al. | 501/10 |

FOREIGN PATENT DOCUMENTS

| | | |
|---|---|---|
| 58-95653 | 6/1983 | Japan. |
| 58-185483 | 10/1983 | Japan. |
| 62-21763 | 1/1987 | Japan. |
| 2-26763 | 10/1990 | Japan. |

OTHER PUBLICATIONS

Das et al., "Sintering and Properties of Silicon Nitride Densified with Liquids in the System MgO-Al-N-SiO$_2$", J. European Ceram Soc 5 (1989) 105–112.

Barta et al., "Pressureless Sintering of Silicon Nitride", Scitence of Ceramics vol. 11, (1981) pp. 219–224.

Masaki et al., "Pressureless Sintering of Silicon Nitride . . .", Yogyo-Kyokai-Shi, 84(10) 1976.

Dupon et al., "Low-Temperature Route to Cordierite Ceramics Using a Reactive Liquid Phase Sintering Aid Dense Body Preparation and Green Tape Fabrication", Mat Res Soc Symp Proc, vol. 154, pp. 351–365. no date.

J. S. Reed, "Introduction to the Principles of Ceramic Processing", p. 349, John Wiley & Sons, New York (1987).

Montasser et al., "Inductively Copled Plasmas in Analytical Atomic Spectrometry" 2nd Ed., VCH Publishers, 1992.

Tan et al, "Applied Spectroscopy", 40(4), pp. 445–460, (1986).

Primary Examiner—Karl Group
Attorney, Agent, or Firm—Dan R. Howard

[57] ABSTRACT

A silicon nitride-based powder composition that yields sintered bodies having a density of at least 3.15 g/cm$^3$ by pressureless sintering. The composition includes silicon nitride and an amount of bismuth oxide as a phase transition aid in addition to magnesium oxide, aluminum oxide, zirconium oxide and, optionally, silicon dioxide. The sintered bodies can be produced at temperatures of 1650° C. or less.

13 Claims, 1 Drawing Sheet

LOW TEMPERATURE, PRESSURELESS SINTERING OF SILICON NITRIDE

BACKGROUND OF THE INVENTION

The present invention relates generally to pressureless sintering of silicon nitride ($Si_3N_4$) compositions. It relates particularly to pressureless sintering of such compositions at temperatures of 1650° Centigrade (°C.) or below. It relates more particularly to pressureless sintering at such temperatures of $Si_3N_4$ compositions that include bismuth oxide ($Bi_2O_3$) and, optionally, zirconium oxide ($ZrO_2$) as part of a sintering aid combination.

Silicon nitride ceramics are recognized for their excellent mechanical and physical properties, including good wear resistance, low coefficient of thermal expansion, good thermal shock resistance, high creep resistance and high electrical resistivity. In addition, $Si_3N_4$ ceramics resist chemical attack, particularly oxidation. These properties or attributes make $Si_3N_4$ ceramics particularly useful in a variety of wear and high temperature applications, such as cutting tools and parts in pumps and engines.

Silicon nitride has two characteristics, covalent bonding and low diffusivity, that pose problems for those seeking to convert $Si_3N_4$ powder to a high density part with little or no porosity. The problems are particularly severe in the absence of densification aids, applied pressure at elevated temperatures as in hot pressing or both.

Hot pressing $Si_3N_4$ powder or preformed parts (also known as greenware) typically yields simple rectangular or disc-shaped articles. These articles must then be converted to a desired shape by various procedures that may be costly, slow or quite difficult because dense $Si_3N_4$ bodies have a high degree of hardness. These procedures, which include grinding, sawing and drilling, generally do not produce intricate shapes. Largely because of limitations such as cost and limited availability of shapes, many efforts focus upon pressureless sintering as a preferred densification route.

U.S. Pat. No. 4,264,547 (de Pous) discloses $Si_3N_4$-based sintering compositions containing $Si_3N_4$ and no more than 6% by weight (wt-%) of very finely ground MgO and $Al_2O_3$ as densification aids. The $Si_3N_4$ has a particle size of less than 1 micrometer ($\mu m$). The MgO has a particle size of 0.05 to 0.1 $\mu m$. The $Al_2O_3$ has a particle size that is less than that of the $Si_3N_4$. The MgO and $Al_2O_3$ are present in a weight ratio that lies between 10:1 and 1:3. Pressureless sintering conditions include heating in a nitrogen atmosphere for 2 to 20 minutes at 1650° to 1830° C.

J. Barta et al., in "Pressureless Sintering of Silicon Nitride", *Science of Ceramics*, Vol 11, pages 219–224 (1981), describe sintering combinations of $Si_3N_4$, MgO, $Al_2O_3$ and, optionally, $SiO_2$ under 1.3 atmospheres (0.13 MPa) at 1550° C. and 1650° C. for one hour. They note that attrition milling is needed to obtain high densities at relatively low temperature. The MgO, $Al_2O_3$ and, optionally, $SiO_2$ are present in a total amount of about 10 wt-%, based upon total combination weight.

R. W. Dupon et al., in "Low-Temperature Route to Cordierite Ceramics Using a Reactive Liquid Phase Sintering Aid, Dense Body Preparation and Green Tape Fabrication", *Materials Research Society Symposium Proceedings*, Vol. 154, pages 351–356 (1989), teach that bismuth oxide ($Bi_2O_3$) is a useful flux for preparing a dense body of cordierite ($Mg_2Al_4Si_5O_{18}$). They also teach that the microstructure of a sintered body formed from 92 wt-% cordierite and 8 wt-% $Bi_2O_3$ has residual $Bi_2O_3$ flux in discontinuous domains at grain boundaries and triple points. Reaction of $Al_2O_3$, MgO and $SiO_2$ to form cordierite and subsequent densification of the cordierite occurs in the presence of 2 to 10 atomic percent bismuth over a 12 hour period at 1000° C. At less than 2 atomic percent bismuth neither the reaction nor densification is complete. They achieve homogeneous distribution of bismuth ions via a precipitation technique.

JP (Kokai) Number 2-263763 describes sintering a molded material consisting of either 0.5–20 wt-% $Bi_2O_3$ powder or a combination of 0.5–10 wt-% $Bi_2O_3$ powder and 0.5–10 wt-% $Al_2O_3$ powder and the balance $Si_3N_4$ powder at a temperature between 1600° C. and 2100° C. under an added pressure of 1 to 2,000 atmospheres (0.101 to 202 MPa). The $Bi_2O_3$ acts as a sintering aid and remains in the sintered material by forming a highly viscous glass phase located at grain boundaries. Combinations of $Bi_2O_3$ and $Al_2O_3$ allow sintering at lower temperature and pressure than $Bi_2O_3$ alone. The reference teaches that $Bi_2O_3$ enhances the toughness of the glass phase and allows the sintered body to retain its strength at high temperatures. The reference also teaches that a post-sintering heat treatment to crystallize the glass phase is unnecessary.

SUMMARY OF THE INVENTION

A first aspect of the present invention is a silicon nitride-based sintering composition in powder form comprising: (a) silicon nitride in an amount of from about 90 to about 98 percent by weight of composition; (b) a densification aid combination of magnesium oxide, aluminum oxide and, optionally, silicon dioxide, the combination being present in an amount of from about 2 to about 10 percent by weight of composition provided that combined amounts of magnesium oxide and aluminum oxide are greater than 2 but less than about 6 percent by weight of composition, the combination having a composition that, when portrayed in a triaxial composition diagram showing inter-relationships among magnesium oxide, aluminum oxide and total silicon dioxide content, is defined and encompassed by a shaded area shaped as a pentahedron and bound by a line that connects points A, B, C, D and E; and (c) bismuth oxide in an amount sufficient to accelerate phase transition aid from alpha- to beta-silicon nitride. As used herein, the phrase "amount sufficient to accelerate" means that transformation of alpha-phase silicon nitride in a sintering composition to beta-phase silicon nitride during sintering occurs more rapidly when such an amount of bismuth oxide is present than when it is absent. In addition, it is believed that such an amount facilitates attainment of a density of at least 3.15 g/cm³ when the silicon nitride powder in the sintering composition has an average particle size in excess of 2 micrometers ($\mu m$). If an amount of zirconium dioxide is present, the amount is desirably less than 2 percent by weight of composition.

A second aspect of the present invention is a process of manufacturing sintered silicon nitride bodies having a density of at least 3.15 g/cm³ and a residual alpha-silicon nitride ($\alpha$-$Si_3N_4$) phase content of less than 10 percent by weight (wt-%) based on total body weight, which process comprises heating a preformed body prepared from the sintering composition of the first aspect to a temperature of from about 1550° C. to about 1650° C. in an atmosphere composed essentially of nitrogen at atmospheric pressure for a period of time sufficient to attain the density.

A third aspect of the present invention is a sintered silicon nitride body prepared from the composition of the first aspect by the process of the second aspect, the sintered body having a residual bismuth content of from greater than 0 to less than about one part per million parts (ppm) of densified body.

Sintered bodies resulting from the sinterable compositions of the present invention have excellent physical properties such as wear resistance that make them suitable for a variety of end use applications. A partial list of such applications includes tappet inserts, valve guides, cam follower rollers, clevis pins, wrist pins, cam lobes, automotive valves, pump seals, needle bearing elements, ball bearings, ball bearing races, bushings, can tooling, punch tooling, needle valve pins, valves and other parts used in chemical process environments, blast nozzles, agitator parts for use in corrosive environments, parts used for abrasive handling apparatus, parts used in cutting applications such as milling, turning and drilling, and parts used in metal drawing or forming applications such as wire drawing dies. Other suitable applications include those listed at column 2, lines 26–48 of U.S. Pat. No. 4,945,073, the teachings of which are incorporated herein by reference.

DESCRIPTION OF PREFERRED EMBODIMENTS

Figure 1:
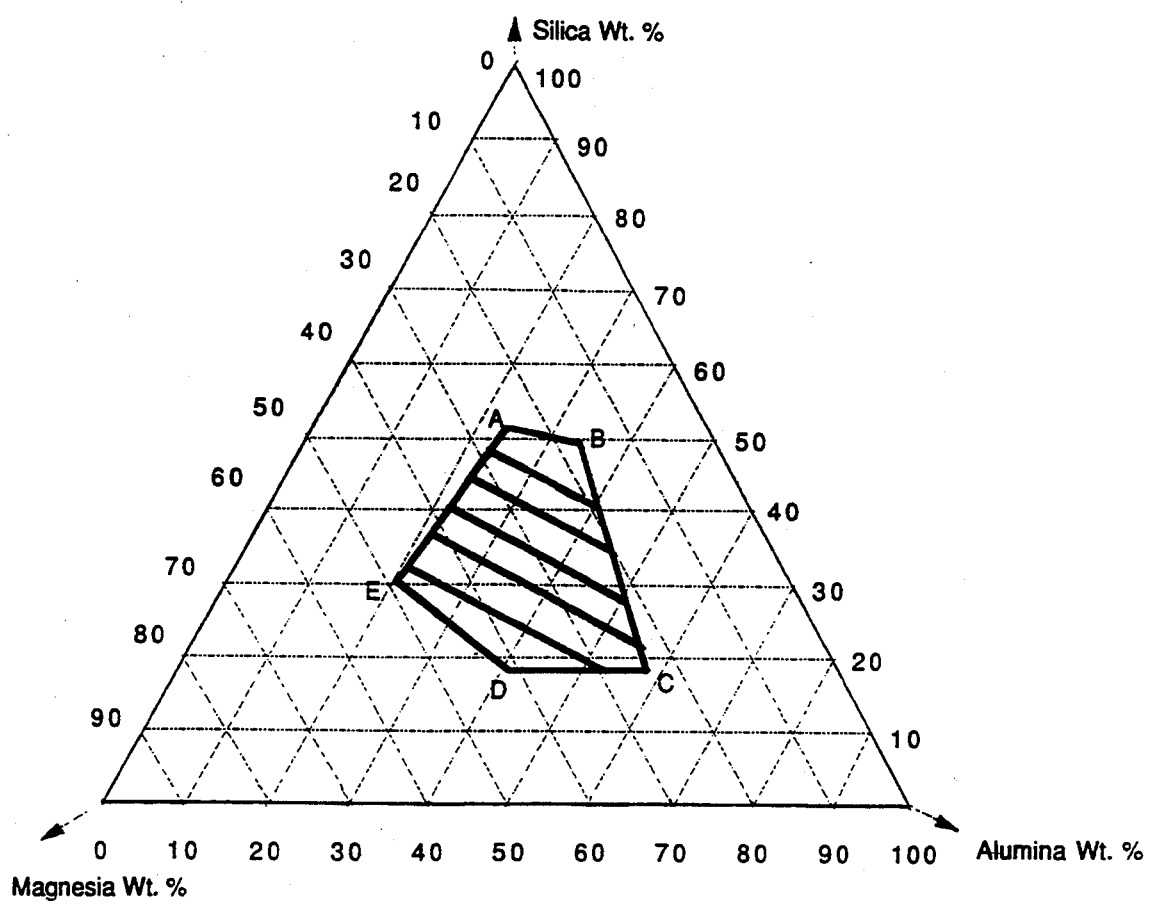
FIG. 1 is a triaxial composition diagram showing combinations of magnesium oxide (MgO), aluminum oxide ($Al_2O_3$) and total silicon dioxide ($SiO_2$) that provide satisfactory sintered $Si_3N_4$ bodies when combined with $Si_3N_4$ in an amount of from 90 to 98 percent by weight of composition and bismuth oxide ($Bi_2O_3$) as a phase transition aid.

For purposes of this invention, any silicon nitride powder, including crystalline forms of $\alpha$-$Si_3N_4$ and $\beta$-$Si_3N_4$, or noncrystalline amorphous $Si_3N_4$, or mixtures thereof, will provide satisfactory results. The powder has a particle size that is desirably less than or equal to about 5 $\mu$m, preferably less than or equal to about 2 $\mu$m. The powder may have such a particle size either as synthesized or as a result of conventional size reduction operations. The latter include ball milling, attrition milling and jet milling.

As a general rule, increases in $Si_3N_4$ powder purity lead to corresponding improvements in physical properties of sintered bodies prepared from such powders. Some sources of $Si_3N_4$ powder may, however, contain metallic and nonmetallic impurities. Some impurities may be tolerated, but there amounts are desirably as low as possible. For example, oxygen is present to some extent as silica ($SiO_2$), typically found as a surface coating on $Si_3N_4$ particles. An oxygen content of no more than about 5 wt-% yields satisfactory results. Other impurities, such as elemental silicon, carbon and metals are suitably within limits disclosed at column 4, lines 2–30 of U.S. Pat. No. 4,883,776, the teachings of which are incorporated herein by reference.

Raw $Si_3N_4$ powder cannot be densified to densities approaching theoretical density in the absence of densification aids such as refractory oxides, or nitrides or a combination of oxides and nitrides. For purposes of the present invention, compositions suitably comprise $Si_3N_4$, magnesium oxide (MgO), aluminum oxide ($Al_2O_3$), silicon dioxide ($SiO_2$), bismuth oxide ($Bi_2O_3$) and, optionally, zirconium dioxide ($ZrO_2$). Components other than $Si_3N_4$ may have a size that is greater than or equal to that of $Si_3N_4$ without adversely affecting properties of sintered bodies prepared from sinterable compositions of the present invention.

Bismuth oxide is used as a phase transition aid. It can also be called a catalyst because, when added to other components of a sintering composition, it performs its desired functions and then, in large part, volatilizes under pressureless sintering conditions. In other words, the latter conditions lead to removal or volatilization of a major portion of the $Bi_2O_3$ in the compositions. The $Bi_2O_3$ is believed to act as a flux early in a pressureless sintering cycle by enhancing diffusion of sintering or densification aids. This leads, in turn, to an accelerated dissolution of $\alpha$-$Si_3N_4$ and, subsequently, to an enhanced reprecipitation of $\oplus'$-SiAlON.

Typical residual $Bi_2O_3$ levels in a sintered body are greater than 0 part by weight per million parts by weight of sintered body (ppm), but no more than one ppm, desirably no more than 300 parts by weight per billion parts by weight of sintered body (ppb) and preferably no more than 200 ppb, following sintering. Residual $Bi_2O_3$ levels may be determined by grinding a sintered body into particles having a size of less than 45 $\mu$m, dissolving the particles in an acid mixture (50/50, by volume, concentrated HF/concentrated $HNO_3$) and then analyzing the acid solution for bismuth content via inductively coupled plasma (ICP) mass spectrometry. ICP mass spectrometry is discussed by Montasser et al. in *Inductively Coupled Plasmas in Analytical Atomic Spectrometry*, Second Edition, VCH Publishers, (1992) and by Tan et al. in *Applied Spectroscopy*, 40(4), pages 445–60, (1986). The compositions desirably have a $Bi_2O_3$ content within a range of from about 0.1 to about 2 wt-%, based upon composition weight. The range is preferably from about 0.1 to about 1.25 wt-%. If the content is less than about 0.1 wt-%, sintered body residual $\alpha$-$Si_3N_4$ phase content tends to be higher and toughness tends to be lower than comparable properties of sintered bodies having a $Bi_2O_3$ content within the range. Amounts in excess of 2 wt-% are not needed. Although sintering does occur with amounts in excess of 2 wt-%, weight losses due to volatility of the $Bi_2O_3$ may be undesirable.

The addition of $Bi_2O_3$ is believed to lead to improvements in toughness without adversely affecting other properties such as hardness relative to sintering compositions that are identical save for the absence of $Bi_2O_3$. The addition of $Bi_2O_3$ is also believed to provide these improvements without substantial grain growth. The minimal grain growth appears to arise from an ability to achieve $\alpha$-$Si_3N_4$ to $\beta'$-SiAlON transformation under less severe conditions, such as temperature and time at temperature, than are needed to attain a density of 3.15 $g/cm^3$ in the absence of $Bi_2O_3$. An advantage of limited grain growth is that it facilitates attainment of very fine surface finishes. These finishes are believed to lead, in turn, to enhanced wear properties.

The MgO and $Al_2O_3$ are desirably present in a combined total amount of greater than 2 but less than 6 percent by weight (wt-%) of the composition. FIG. 1 shows interrelationships among MgO, $Al_2O_3$ and total $SiO_2$ content. Densified $Si_3N_4$ bodies having a density of 3.15 g/cc or greater are readily obtained from combinations of MgO, $Al_2O_3$ and total $SiO_2$ content that lie on or within lines connecting point A to point B, point B to point C, point C to point D, point D to point E and point E to point A thereby forming pentahedron ABCDE. Component amounts, in terms of weight percent based upon combined amounts of MgO, Al$_2$O$_3$ and total SiO$_2$, for each point are as follows: point A—25% MgO, 24% Al$_2$O$_3$ and 51% total SiO$_2$; point B—17% MgO, 34% Al$_2$O$_3$ and 49% total SiO$_2$; point C—24% MgO, 58% Al$_2$O$_3$ and 18% total SiO$_2$; point D—41% MgO, 41% Al$_2$O$_3$ and 18% total SiO$_2$; and point E—49% MgO, 21% Al$_2$O$_3$ and 30% total SiO$_2$. Total SiO$_2$ content is made up of oxygen in the Si$_3$N$_4$ powder (assumed to be present as SiO$_2$) and any SiO$_2$ additions. A Si$_3$N$_4$ powder having an alpha-Si$_3$N$_4$ content of greater than 90% is believed to have a minimum oxygen content of 0.8%. This converts to an approximate minimum total SiO$_2$ content of 18% for points D and E.

In a typical process, silicon nitride powder and other components of the compositions are milled together using conventional apparatus such as ball mills, attrition mills, jet mills and vibratory mills. The compositions may be milled or blended either by wet or dry milling. Wet milling using an attrition mill and a carrier medium yields satisfactory results. Suitable carrier media and amounts thereof are listed at column 6, line 62 through column 7, line 17 of U.S. Pat. No. 4,883,776, the relevant teachings of which are incorporated herein by reference. The carrier medium is preferably water, an alcohol such as ethanol, or a ketone. After milling, the blended powder is dried, recovered, pressed into a desired shape and densified. Drying employs standard means such as spray drying or oven drying under a nitrogen purge. Subsequent to drying, the powder is beneficially sieved through a screen to obtain a powder having a desirable size. Cold isostatic pressing, particularly when preceded by uniaxial cold pressing, provides satisfactory shaped articles. Suitable pressures for such pressing are, respectively, 5,000 pounds per square inch (psi) (35 MPa) and 35,000 psi (245 MPa).

Shaped articles made from the compositions described above are densified by pressureless sintering. Other conventional densification techniques such as hot pressing and hot isostatic pressing may also be used if desired. Densification desirably occurs in the presence of a nitrogen atmosphere at a temperature of from about 1550° to 1650° C. At temperatures below 1550° C., it is difficult, if not impossible, to attain a density of at least 3.15 g/cm$^3$ in a commercially reasonable time. At temperatures in excess of 1650° C., sintering occurs, but advantages of low temperature sintering are lost. At temperatures in excess of 1800° C., Si$_3$N$_4$ begins to decompose under pressureless sintering conditions. The resultant densified articles desirably have a density of at least 3.15 g/cm$^3$.

Sintering can occur with crucibles and furniture that are fabricated from either alumina or boron nitride. The crucible and furniture may also be fabricated from a ceramic material other than boron nitride and then coated with boron nitride. It can also occur in an oxide-based furnace in the presence of flowing nitrogen gas.

If a binder is used to convert the powdered sintering composition into ceramic greenware or a cast tape, an additional step may be added prior to sintering. In this step, either the uncompacted powder or the powder compact is heated at moderate temperatures such as from about 500° to 1,000° C. in order to remove volatile binder materials. The same temperatures may be sufficient to partially react the starting ceramic materials.

Mechanical properties of sintered bodies are readily measured by use of standard tests. Fracture toughness (K$_{IC}$) is measured by the Chevron notch technique. Fracture strength (modulus of rupture) is suitably measured according to Military Standard 1942b or Japanese Industrial Standard (JIS) 1601. Military Standard 1942b, which incorporates a 4-point bend test, is explained in detail at column 10, line 57–68 of U.S. Pat. No. 4,883,776, the teachings of which are incorporated herein by reference. Hardness is measured according to the Vickers indentation test which is explained at column 11, lines 43–64 of U.S. Pat. No. 4,883,776, the teachings of which are incorporated herein by reference. Density is determined by the Archimedes method. α- and β-SiAlON concentrations in sintered bodies are determined by powder x-ray diffraction of crushed samples.

The following examples are solely for purposes of illustration and are not to be construed, either implicitly or explicitly, as limiting the scope of the present invention. Unless otherwise stated, all parts or percentages are based upon weight.

EXAMPLE 1

A powdered composition is prepared from: 100 grams (g) Si$_3$N$_4$ powder, (Ube Industries, SN-E10), and having an average particle size (diameter) of 0.6 μm and a nominal BET surface area of 11 m$^2$/g; 0.78 g fumed silica (Cabot Corp., CABOSIL TM L90); 2.82 g Al$_2$O$_3$ (Aluminum Company of America, A-16 Superground); 2.78 g MgO (Fisher Scientific); and 0.58 g Bi$_2$O$_3$ (Johnson-Matthey, 99.99 % purity). The composition is attrited for one hour at 350 revolutions per minute (rpm) using a Union Process (Model 1S) heavy duty lab attritor, 3/16 inch (0.48 cm) yttria stabilized zirconia media and 225 cm$^3$ of denatured ethanol as a carrier medium. The attrited composition is dried under flowing nitrogen at a temperature of 60° C. for a period of 18 hours to provide a mixture of dried powder and milling media. The media is separated from the dried powder by screening through a 60 mesh (Tyler equivalent) (250 μm sieve aperture) stainless steel screen. A 10 gram quantity of the dried powder is converted to a pressed part by pressing the powder in a 1 inch (2.54 cm) diameter steel die at a pressure of 5,000 psi (34.5 MPa). The pressed part is then placed in a rubber bag that is evacuated and then wet bag isopressed at 36,000 psi (248 MPa) to provide sinterable samples. Wet bag isopressing is described by J. S. Reed in *Introduction to the Principles of Ceramic Processing* at page 349, John Wiley & Sons, New York (1987). The samples are sintered at 1610° C. for four hours in a boron nitride crucible under flowing nitrogen at atmospheric pressure using a heating rate of 20° C. per minute. The sintered samples have a fracture strength (Military Standard 1942b) of 721 MPa, a hardness (Vickers with a 10.3 kg load) of 1550 kg/mm$^2$, a density of 3.16 g/cm$^3$ and a fracture toughness (Chevron notch) of 6.64 MPa·m$^{\frac{1}{2}}$.

EXAMPLES 2-15

The procedures of example 1 are replicated through separation or recovery of the dried powder. Eighty gram quantities of the dried powder are pressed into a 1 inch (2.5 cm) by 6 inch (15 cm) steel die at a pressure of 4,000 psi (27.6 MPa) to provide pressed parts that are then wet bag isopressed, placed in enclosed boron nitride crucibles (Carborundum AX05) and sintered in the presence of flowing nitrogen. Sintering occurs in a furnace using the following schedule: heat at 20° C./minute from ambient temperature to 1425° C.; hold at 1425° C. for 30 minutes; heat at 20° C./minute up to 1575° C.; hold at 1575° C. for 300 minutes; heat at 20° C./minute up to 1625° C.; and hold at 1625° C. for 60 minutes. The crucible and its contents are removed from the furnace after cooling to ambient or room temperature (taken as 25° C.). Powder compositions, wt-% of MgO, $Al_2O_3$ and $SiO_2$ (based upon total weight of MgO, $Al_2O_3$ and $SiO_2$), amount of $SiO_2$ present on $Si_3N_4$ powder, Vickers Hardness and density measurements of the resultant sintered parts are shown in Table I. The sintered parts had a residual bismuth content, measured by ICP as described herein, of 50 to 300 parts per billion parts by weight of sintered part.

$SiO_2$ weight percentages, based on combined weight thereof, must fall inside the pentahedron shown in the FIGURE. The second condition is that MgO and $Al_2O_3$ must be present in a combined amount of greater than 2 wt-%, but less than 6 wt-%, based on total sintering composition weight. Second, $SiO_2$ addition is optional as evidenced by Examples 4 and 5 so long as the aforementioned conditions are met. Third, the addition of a large amount of additional silica does not provide a desired density even though total densification aid concentration is increased.

EXAMPLES 16–28

Examples 16–28 are prepared by replicating the procedure used for Examples 2–15. Table II lists composi-

TABLE I

| Example Number | Composition Component Weight Percentages | | | | | $SiO_2$ Content of $Si_3N_4$ | Total $SiO_2$ | Weight Percentages** | | | Vickers Hardness (kg/mm$^2$) | Density (g/cm$^3$) |
|---|---|---|---|---|---|---|---|---|---|---|---|---|
| | $Si_3N_4$ | MgO | $Al_2O_3$ | $Bi_2O_3$ | Added $SiO_2$ | | | MgO | $Al_2O_3$ | Total $SiO_2$ | | |
| 2 | 94.9 | 2.3 | 2.3 | 0.07 | 0.34 | 1.78 | 2.12 | 34 | 34 | 32 | 1541 | 3.18 |
| 3 | 94.8 | 3.2 | 1.5 | 0.24 | 0.34 | 1.78 | 2.12 | 47 | 22 | 31 | 1593 | 3.16 |
| 4 | 94.8 | 1.6 | 3.4 | 0.24 | 0.0 | 1.78 | 1.78 | 24 | 50 | 26 | 1499 | 3.17 |
| 5 | 96.5 | 1.5 | 1.5 | 0.5 | 0.0 | 1.81 | 1.81 | 31 | 31 | 38 | — | 3.18 |
| 6 | 94.8 | 2.3 | 2.3 | 0.24 | 0.24 | 1.78 | 2.02 | 35 | 35 | 30 | 1556 | 3.17 |
| 7 | 94.8 | 1.4 | 3.2 | 0.24 | 0.34 | 1.78 | 2.12 | 21 | 48 | 31 | 1520 | 3.15 |
| 8* | 94.8 | 0.7 | 2.6 | 0.24 | 1.7 | 1.78 | 3.48 | 10 | 39 | 51 | 1558 | 3.08 |
| 9* | 94.8 | 2.6 | 0.7 | 0.24 | 1.7 | 1.78 | 3.48 | 39 | 10 | 51 | 1458 | 3.14 |
| 10* | 97.5 | 1.0 | 1.0 | 0.5 | 0.0 | 1.83 | 1.83 | 26 | 26 | 48 | — | 3.04 |
| 11* | 94.8 | 3.4 | 1.6 | 0.24 | 0.0 | 1.78 | 1.78 | 50 | 24 | 26 | 1143 | 3.08 |
| 12* | 95.0 | 1.0 | 3.8 | 0.24 | 0.0 | 1.78 | 1.78 | 15 | 58 | 27 | — | 3.14 |
| 13 | 94.8 | 2.0 | 2.0 | 0.24 | 1.0 | 1.78 | 2.78 | 30 | 30 | 40 | 1524 | 3.15 |
| 14* | 92.0 | 2.3 | 2.2 | 0.23 | 3.3 | 1.72 | 5.02 | 24 | 23 | 53 | 1508 | 3.13 |
| 15* | 94.9 | 1.6 | 1.6 | 0.24 | 1.7 | 1.78 | 3.48 | 24 | 24 | 52 | 1551 | 3.13 |

*Not an example of the Invention
**Based on combined weight of MgO, $Al_2O_3$ and Total $SiO_2$
— = Not Measured The data presented in Examples 2–15 demonstrate several points. First, sintering compositions do not yield a sintered density of at least 3.15 g/cm$^3$ unless two conditions are met. One is that the MgO, $Al_2O_3$ and total tions used in preparing sintered parts as well as toughness (Chevron notch), strength, Vickers Hardness and density of the resultant sintered parts.

TABLE II (Part 1)

| Example Number | Composition Component Weight Percentages | | | | | $SiO_2$ Content of $Si_3N_4$ | Total $SiO_2$ | Weight Percentages* | | |
|---|---|---|---|---|---|---|---|---|---|---|
| | $Si_3N_4$ | MgO | $Al_2O_3$ | $Bi_2O_3$ | Added $SiO_2$ | | | MgO | $Al_2O_3$ | Total $SiO_2$ |
| 16 | 94.7 | 2.1 | 1.9 | 0.7 | 0.6 | 1.78 | 2.38 | 33 | 30 | 37 |
| 17 | 94.5 | 2.3 | 2.3 | 0.24 | 0.66 | 1.78 | 2.44 | 33 | 33 | 34 |
| 18 | 94.3 | 2.3 | 2.3 | 0.47 | 0.65 | 1.77 | 2.42 | 33 | 33 | 34 |
| 19 | 95.2 | 2.1 | 1.9 | 0.24 | 0.56 | 1.78 | 2.34 | 33 | 30 | 37 |
| 20 | 93.8 | 2.5 | 2.8 | 0.24 | 0.73 | 1.76 | 2.49 | 32 | 36 | 32 |
| 21 | 94.2 | 2.3 | 2.3 | 0.7 | 0.65 | 1.77 | 2.42 | 33 | 33 | 34 |
| 22 | 93.9 | 2.7 | 2.4 | 0.24 | 0.73 | 1.76 | 2.49 | 35 | 32 | 33 |
| 23 | 94.3 | 2.4 | 2.2 | 0.47 | 0.65 | 1.77 | 2.42 | 34 | 31 | 35 |
| 24 | 94.3 | 2.2 | 2.4 | 0.47 | 0.65 | 1.77 | 2.42 | 31 | 34 | 35 |
| 25 | 94.9 | 2.3 | 2.3 | 0.12 | 0.35 | 1.78 | 2.13 | 34 | 34 | 32 |
| 26 | 95.0 | 2.3 | 2.3 | 0.07 | 0.35 | 1.78 | 2.13 | 34 | 34 | 32 |
| 27* | 94.7 | 2.3 | 2.3 | 0.0 | 0.65 | 1.78 | 2.43 | 33 | 33 | 34 |
| 28* | 95.4 | 2.1 | 1.9 | 0.0 | 0.56 | 1.79 | 2.35 | 33 | 30 | 37 |

(Part 2)

| Example Number | Chevron Notch Toughness (MPa √m) | Strength (MPa) | Vicers Hardness (kg/mm$^2$) | Density (g/cm$^3$) | Residual α-$Si_3N_4$ (%) |
|---|---|---|---|---|---|
| 16 | 6.38 | 450 | 1474 | 3.17 | — |
| 17 | 6.59 | 764 | 1474 | 3.17 | 0 |
| 18 | 6.28 | 640 | 1485 | 3.17 | 0 |
| 19 | 6.30 | 510 | 1474 | 3.16 | — |
| 20 | 6.13 | 670 | 1452 | 3.16 | — |
| 21 | 6.22 | 466 | 1461 | 3.16 | 0 |

TABLE II-continued

| | | | | | |
|---|---|---|---|---|---|
| 22 | 6.59 | 551 | 1452 | 3.16 | — |
| 23 | 6.28 | 640 | 1456 | 3.17 | — |
| 24 | 6.25 | 600 | 1463 | 3.17 | — |
| 25 | — | 671 | 1515 | 3.17 | 0 |
| 26 | — | 810 | 1541 | 3.18 | 4 |
| 27* | 3.98 | 917 | 1590 | 3.18 | 28 |
| 28* | 4.81 | 1076 | 1590 | 3.18 | 16 |

*Not an example of the Invention
**Based on combined weight of MgO, Al₂O₃ and Total SiO₂
— = Not Measured The data in Table II demonstrate the advantageous effect that $Bi_2O_3$ has on the sintering of $Si_3N_4$ in the $MgO$-$Al_2O_3$-total $SiO_2$ densification aid system. Example 25 shows that full conversion to $\beta'$-SiAlON is possible with low $Bi_2O_3$ additions (0.12 wt-%). Example 26 shows that even very low $Bi_2O_3$ concentrations cause almost complete $\alpha$-$Si_3N_4$ to $\mu'$-SiAlON transformation (4 wt-% residual $\alpha$-$Si_3N_4$) under conditions specified for the example. In the absence of $Bi_2O_3$, as shown in Examples 27 and 28, residual $\beta$-$Si_3N_4$ concentrations exceed 10 wt-% under the same conditions. Incomplete conversion leads, in turn, to lower toughness, a generally undesirable trend. The presence of $Bi_2O_3$ thus improves toughness without excess reduction of strength or a large increase in grain size. Compare, for example, Examples 17 and 27 wherein toughness increases by about 65% whereas strength decreases by only about 17% and hardness decreases by about 8%. at the same time grain size only increases from 0.17 $\mu$m ($\pm 0.08$ $\mu$m) to 0.28 $\mu$m ($\pm 0.15$ $\mu$m). In other words, the addition of $Bi_2O_3$ in sufficient quantities accelerates the $\alpha$-$Si_3N_4$ to $\beta'$-SiAlON transformation under a given set of sintering conditions and enhances toughness without an undesirable level of decrease in other desirable physical properties. In addition, only trace amounts of $Bi_2O_3$ remain in sintered bodies. This means that desirable improvements are attainable with very little composition modification.

EXAMPLES 29-34

Effect of Zirconia Addition

Examples 29-34 are prepared by replicating, with certain exceptions, the procedure of Examples 2-15. Examples 29, 31 and 32 use silicon nitride milling media rather than zirconia milling media. This has the effect of excluding zirconia from the sintered bodies. The use of zirconia milling media typically results in the addition of 0.25 to 0.75 wt-% of zirconia to the compositions used in making the sintered bodies. Examples 29 and 30 use the sintering program of Examples 2-15 save for extending the hold time at 1625° C. from 60 minutes to 180 minutes and eliminating the steps of holding at 1425° C. and 1575° C. Examples 31 and 33 use the same sintering program as Examples 29 and 30 save for reducing the sintering temperature from 1625° C. to 1600° C. Examples 32 and 34 use the sintering program of Examples 29 and 30 save for increasing the temperature from 1625° C. to 1650° C. In addition, Examples 29 and 30 use a $Si_3N_4$ powder having a BET surface area of 19.5 m²/g (Starck, LC-12N) rather than the $Si_3N_4$ powder of Example 1. Table III shows compositions used to make sintered parts and density of the resultant sintered parts.

TABLE III (Part 1)

| Example Number | Composition Component Weight Percentages | | | | | SiO₂ Added on Si₃N₄ | Total SiO₂ |
|---|---|---|---|---|---|---|---|
| | Si₃N₄ | MgO | Al₂O₃ | Bi₂O₃ | Added SiO₂ | | |
| 29* | 93.5 | 2.6 | 2.6 | 0.55 | 0.73 | 2.52 | 3.25 |
| 30 | 93.5 | 2.6 | 2.6 | 0.55 | 0.73 | 2.52 | 3.25 |
| 31 | 95.9 | 1.8 | 1.8 | 0.5 | 0.0 | 1.80 | 1.80 |
| 32 | 95.9 | 1.8 | 1.8 | 0.5 | 0.0 | 1.80 | 1.80 |
| 33 | 95.9 | 1.8 | 1.8 | 0.5 | 0.0 | 1.80 | 1.80 |
| 34 | 95.9 | 1.8 | 1.8 | 0.5 | 0.0 | 1.80 | 1.80 |

(Part 2)

| Example Number | Weight Percentages** | | | ZrO₂ Present | Density (g/cm³) |
|---|---|---|---|---|---|
| | MgO | Al₂O₃ | Total SiO₂ | | |
| 29* | 31 | 31 | 38 | No | 3.14 |
| 30 | 31 | 31 | 38 | Yes | 3.16 |
| 31 | 33 | 34 | 33 | No | 3.16 |
| 32 | 33 | 34 | 33 | No | 3.17 |
| 33 | 33 | 34 | 33 | Yes | 3.16 |
| 34 | 33 | 34 | 33 | Yes | 3.17 |

*Not an example of the Invention
N/A = Not Applicable
— = Not Measured
**Based on Combined weight of MgO, Al₂O₃ and Total SiO₂

The data in Table III illustrate several points. First, a comparison of Examples 29 and 30 demonstrates the usefulness of zirconia in attaining a density of at least 3.15 g/cm³. Second, Examples 31-34 again show that silica additions are not necessary to attain such a density. Third, Examples 31-34 show that $Si_3N_4$ powders having no particles greater than 2 $\mu$m do not require $ZrO_2$ to attain such a density. With larger particle sizes, $ZrO_2$ additions help promote densification. Thus, densification aid combinations within the $MgO$-$Al_2O_3$-total $SiO_2$ pentahedron of the FIGURE require only small amounts of $Bi_2O_3$ for development of sintered bodies with high toughness and minimal residual $\alpha$-$Si_3N_4$ concentration, provided that MgO and $Al_2O_3$ are present in a combined amount of greater than 2 wt-%, but less than 6 wt-%, based on total sintering composition weight.

Although this series of examples incorporates zirconia by way of the milling media, similar results are expected when powdered zirconia is added with the other powdered components in preparing the sintered bodies.

EXAMPLES 35-47

Effect of Starting Si₃N₄ Powder

Examples 35-47 are prepared by replicating the process used for Examples 2-15 save for varying the highest temperature used in sintering, the time at that temperature and eliminating the steps of holding at temperatures of 1425° C. and 1575° C. In addition, Examples 35-47 use silicon nitride powders other than that used in Examples 1-15.

Example 47 uses the same silicon nitride powder as in Examples 1–15. For purposes of Table IV, that powder is designated as "A". It has a nominal average particle diameter (d50) of 0.6 μm, a maximum particle size of 2 μm and contains 100% α-Si$_3$N$_4$. Powder "B" is commercially available from Shinetsu under the trade designation KSN 10SP. It has a nominal average particle diameter (d50) of 0.6 μm, a maximum particle size of 2 μm and a BET surface area of 13 m$^2$/g, and it contains 94.0% α-Si$_3$N$_4$. Powder "C" is commercially available from Shinetsu under the trade designation KSN 20SP. It has a nominal average particle diameter (d50) of 0.9 μm, a maximum particle size of 4.8 μm and a BET surface area of 12.8 m$^2$/g, and it contains 79% α-Si$_3$N$_4$. Powder "D" is commercially available from Shinetsu under the trade designation KSN 80SP. It has a nominal average particle diameter (d50) of 0.6 μm, a maximum particle size of 4 μm and a BET surface area of 10 m$^2$/g, and it contains 17% α-Si$_3$N$_4$. Powder "E" is commercially available from Shinetsu under the trade designation KSN 10M-TX. It has a nominal average particle diameter (d50) of 1.2 μm, a maximum particle size of 13.7 μm and a BET surface area of 8 m$^2$/g, and it contains 94% α-Si$_3$N$_4$.

Table IV lists the components used to make Examples 35–47, identifies the Si$_3$N$_4$ source, provides the sintering temperature and time at temperature, and shows the density of resulting sintered bodies.

TABLE IV

| | | (Part 1) | | | | | | | (Part 2) | | | | |
|---|---|---|---|---|---|---|---|---|---|---|---|---|---|
| | | Composition Component Weight Percentages | | | | | SiO$_2$ On Si$_3$N$_4$ | Total SiO$_2$ | Weight Percentages** | | | Sinter Temp. (°C.) | Sinter time (Hrs) | Density (g/cm$^3$) |
| Example Number | Si$_3$N$_4$ Type | Si$_3$N$_4$ | MgO | Al$_2$O$_3$ | Bi$_2$O$_3$ | SiO$_2$ | | | MgO | Al$_2$O$_3$ | Total SiO$_2$ | | | |
| 35* | C | 95.1 | 2.3 | 2.3 | 0.12 | 0.15 | 2.42 | 2.57 | 32 | 32 | 36 | 1650 | 1 | 3.14 |
| 36* | E | 95.1 | 2.3 | 2.3 | 0.12 | 0.15 | 2.44 | 2.59 | 32 | 32 | 36 | 1650 | 1 | 2.98 |
| 37* | B | 94.4 | 2.3 | 2.3 | 0.12 | 1.0 | 1.15 | 2.15 | 34 | 34 | 32 | 1650 | 1 | 3.08 |
| 38 | D | 94.7 | 2.3 | 2.3 | 0.12 | 0.7 | 1.08 | 1.78 | 36 | 36 | 28 | 1650 | 1 | 3.17 |
| 39 | C | 95.1 | 2.3 | 2.3 | 0.12 | 0.15 | 2.42 | 2.57 | 32 | 32 | 36 | 1750 | 1 | 3.17 |
| 40* | E | 95.1 | 2.3 | 2.3 | 0.12 | 0.15 | 2.44 | 2.59 | 32 | 32 | 36 | 1750 | 1 | 2.96 |
| 41 | B | 94.4 | 2.3 | 2.3 | 0.12 | 1.0 | 1.15 | 2.15 | 34 | 34 | 32 | 1750 | 1 | 3.15 |
| 42 | D | 94.7 | 2.3 | 2.3 | 0.12 | 0.7 | 1.08 | 1.78 | 36 | 36 | 28 | 1750 | 1 | 3.18 |
| 43 | C | 95.1 | 2.3 | 2.3 | 0.12 | 0.15 | 2.42 | 2.57 | 32 | 32 | 36 | 1650 | 4 | 3.17 |
| 44* | E | 95.1 | 2.3 | 2.3 | 0.12 | 0.15 | 2.44 | 2.59 | 32 | 32 | 36 | 1650 | 4 | 3.03 |
| 45* | B | 94.4 | 2.3 | 2.3 | 0.12 | 1.0 | 1.15 | 2.15 | 34 | 34 | 32 | 1650 | 4 | 3.14 |
| 46 | D | 94.7 | 2.3 | 2.3 | 0.12 | 0.7 | 1.08 | 1.78 | 36 | 36 | 28 | 1650 | 4 | 3.18 |
| 47 | A | 93.3 | 2.6 | 2.6 | 0.75 | 0.7 | 1.75 | 2.45 | 34 | 34 | 32 | 1575 | 3 | 3.16 |

*Not an example of the Invention
**Based on Combined weight of MgO, Al$_2$O$_3$ and Total SiO$_2$ The data presented in Table IV illustrate several points. First, a comparison of Examples 35, 37, 39, 41, 43 and 45 shows that higher sintering temperatures or longer times at a sintering temperature may be needed for certain powders in order to obtain a density of at least 3.15 g/cm$^3$. Second, Examples 36, 40 and 44 suggest that Si$_3$N$_4$ powders having a comparatively large maximum particle size (13.7 μm) are not conducive to realizing a density of 3.15 g/cm$^3$ or greater. The remaining Examples in Table IV show that Si$_3$N$_4$ powders having smaller maximum particle sizes (on the order of 4.8 μm or less) can yield a density of at least 3.15 g/cm$^3$. Other Si$_3$N$_4$ powders that have a maximum particle size in excess of 4.8 μm, but less than 13.7 μm, should also provide such a density provided sufficient Bi$_2$O$_3$, Al$_2$O$_3$ and MgO are present and sintering temperatures and time at sintering temperature are optimized. Fourth, Examples 38, 42 and 46 show that Si$_3$N$_4$ powders having a relatively low α-Si$_3$N$_4$ content and a correspondingly high β-Si$_3$N$_4$ content can yield a satisfactory density. Fifth, Example 47 shows that it is possible to prepare a sintered body with a density of at least 3.15 g/cm$^3$ at temperatures below 1600° C. Similar results are expected with other Si$_3$N$_4$ powders, combinations of sintering time, sintering temperature and component amounts, all of which are disclosed herein.

What is claimed is:

1. A silicon nitride-based sintering composition in powder form comprising (a) silicon nitride in an amount of from about 90 to about 98 percent by weight of composition; (b) a densification aid combination of magnesium oxide, aluminum oxide and, optionally, silicon dioxide, the combination being present in an amount of from about 2 to about 10 percent by weight of composition provided that combined amounts of magnesium oxide and aluminum oxide are greater than 2 but less than about 6 percent by weight of composition, the combination having a composition that, when portrayed in a triaxial composition diagram showing interrelationships among magnesium oxide, aluminum oxide and total silicon dioxide content, is defined and encompassed by a shaded area shaped as a pentahedron and bound by a line that connects points A, B, C, D and E wherein the points are defined in terms of weight percent as: point A—25% MgO, 24% Al$_2$O$_3$, and 51% SiO$_2$; point B—17% MgO, 34% Al$_2$O$_3$, and 49% SiO$_2$; point C—24% MgO, 58% Al$_2$O$_3$, and 18% SiO$_2$; point D—41% MgO, 41% Al$_2$O$_3$, and 18% SiO$_2$; and point E—49% MgO, 21% Al$_2$O$_3$, and 30% SiO$_2$; and (c) bismuth oxide in an amount sufficient to accelerate phase transition aid from alpha- to beta-silicon nitride.

2. The composition of claim 1, wherein the silicon nitride has a particle size that is less than or equal to 5 μm and each component of the composition other than silicon nitride has a particle size that is greater than that of silicon nitride.

3. The composition of claim 2, wherein the silicon nitride has a particle size that is less than or equal to 2 μm.

4. The composition of claim 1, wherein the densification aid combination also includes zirconium oxide in an amount that is greater than 0 but less than 2 percent by weight of the composition.

5. The composition of claim 1, wherein the amount of bismuth oxide is from about 0.1 to about 2 percent by weight of the composition.

6. A process for manufacturing a sintered silicon nitride body having a density of at least 3.15 g/cm$^3$ and an alpha-silicon nitride content of less than about 10 percent by weight based upon weight of silicon nitride in the body, the process comprising heating a preformed body to sintering conditions of a temperature of from about 1550° C. to 1650° C. in an atmosphere composed essentially of nitrogen at atmospheric pressure for a period of time sufficient to attain the density, the body being prepared from a composition comprising (a) silicon nitride in an amount of from about 90 to about 98 percent by weight of composition; (b) a densification aid combination of magnesium oxide, aluminum oxide and, optionally, silicon dioxide, the combination being present in an amount of from about 2 to about 10 percent by weight of composition provided that combined amounts of magnesium oxide and aluminum oxide are greater than 2 but less than about 6 percent by weight of composition, the combination having a composition that, when portrayed in a triaxial composition diagram showing interrelationships among magnesium oxide, aluminum oxide and total silicon dioxide content, is defined and encompassed by a shaded area shaped as a pentahedron and bound by a line that connects points A, B, C, D and E, wherein the points are defined in terms of weight percent as: point A—25% MgO, 24% $Al_2O_3$, and 51% $SiO_2$; point B—17% MgO, 34% $Al_2O_3$, and 49% $SiO_2$; point C—24% MgO, 58% $Al_2O_3$, and 18% $SiO_2$; point D—41% MgO, 41% $Al_2O_3$, and 18% $SiO_2$; and point E—49% MgO, 21% $Al_2O_3$, and 30% $SiO_2$; and (c) bismuth oxide in an amount sufficient to accelerate phase transition from alpha- to beta-silicon nitride, a major portion of the bismuth oxide being volatilized under the sintering conditions.

7. The process of claim 6, wherein the densification aid combination also includes zirconium oxide in an amount that is greater than 0 but less than 2 percent by weight of the composition.

8. The process of claim 6, wherein the period of time is from about 10 minutes to about 12 hours.

9. The process of claim 6, wherein heating the preformed body causes removal of a major portion of the bismuth oxide.

10. The process of claim 9, wherein sufficient bismuth oxide is removed to provide the sintered body with a bismuth oxide content of greater than 0, but less than 1 part by weight per million parts by weight of sintered body.

11. The process of claim 10, wherein the bismuth oxide content is less than 300 parts by weight per billion parts by weight of sintered body.

12. A sintered silicon nitride body with a density of at least 3.15 $g/cm_3$, and an alpha-silicon nitride content of less than about 10 percent by weight based upon weight of silicon nitride in the body and a bismuth oxide content of from greater than 0 to less than about one part per million parts (ppm) of densified body.

13. The sintered body of claim 12, wherein the bismuth oxide content is less than 300 parts by weight per billion parts by weight of sintered body.

* * * * *